Dec. 24, 1957 T. T. JOHNSON ET AL 2,817,831
COORDINATE SYSTEM TRANSLATOR
Filed March 24, 1952 2 Sheets-Sheet 1
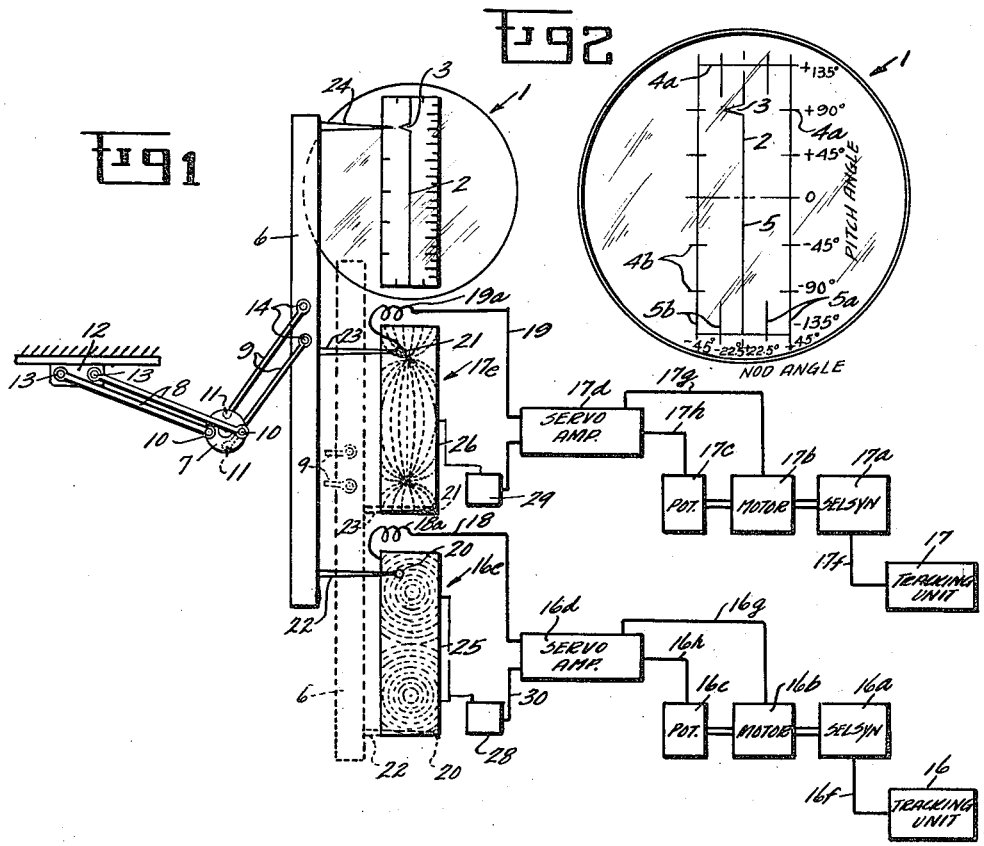
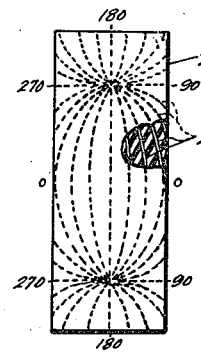
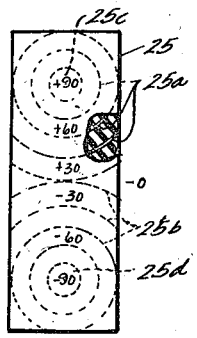
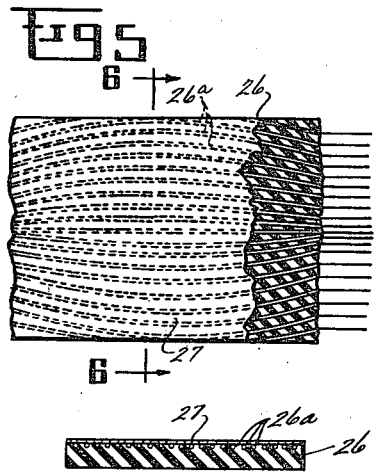
INVENTORS
THEODORE T. JOHNSON
RUSSELL W. McFALL
BY RICHARD W. SAMSEL
ATTORNEYS Dec. 24, 1957  T. T. JOHNSON ET AL  2,817,831
COORDINATE SYSTEM TRANSLATOR
Filed March 24, 1952  2 Sheets-Sheet 2
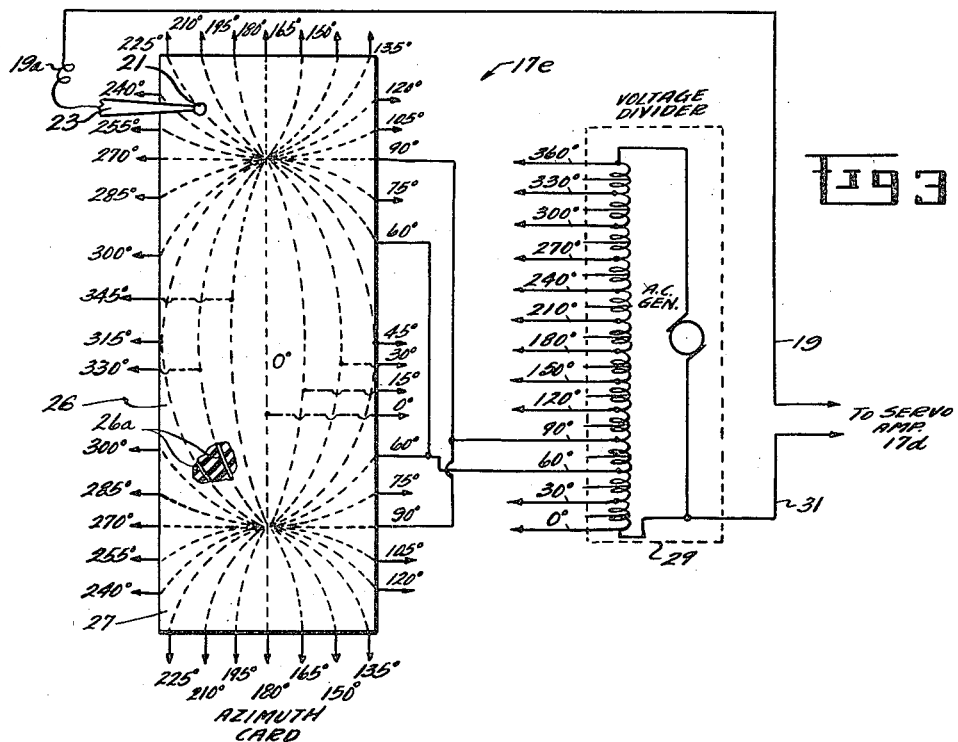
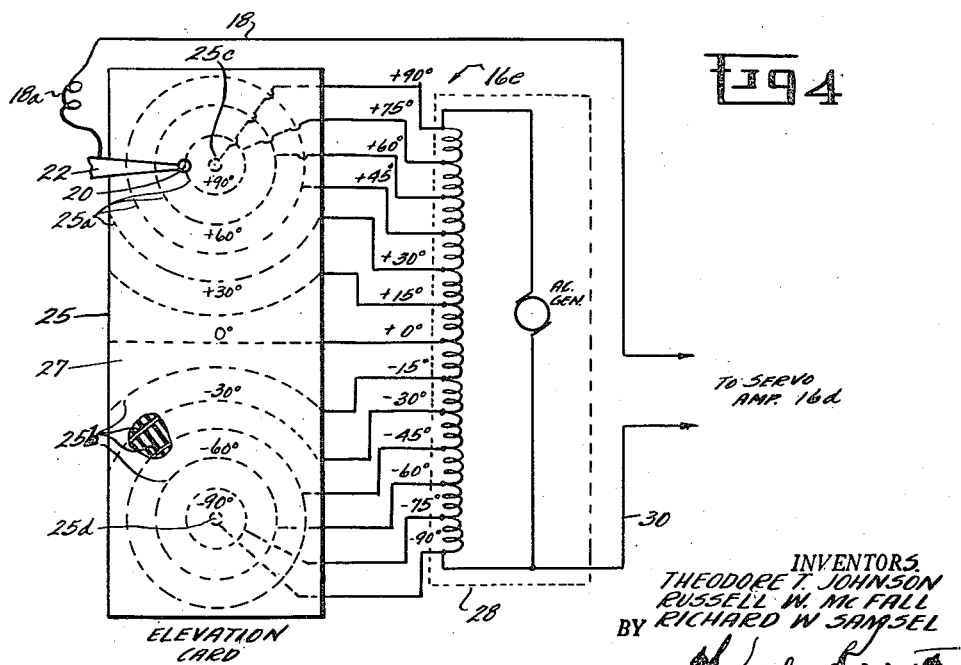
INVENTORS.
THEODORE T. JOHNSON
RUSSELL W. McFALL
BY RICHARD W. SAMSEL
ATTORNEYS › # United States Patent Office 2,817,831
Patented Dec. 24, 1957

2,817,831

COORDINATE SYSTEM TRANSLATOR

Theodore T. Johnson, Schenectady, and Russell W. McFall and Richard W. Samsel, Scotia, N. Y., assignors to the United States of America as represented by the Secretary of the Air Force Application March 24, 1952, Serial No. 278,278

9 Claims. (Cl. 343—7)

This invention relates to an apparatus for converting information from one coordinate system to equivalent information relative to a different coordinate system, and more particularly to a "search" radar Coordinate System Translator comprising an electro-mechanical computing device which converts pitch and nod information derived from a cathode-ray tube presentation surface into terms of "elevation" and "azimuth" for use in operating a target tracking apparatus, for instance, of a military aircraft.

A search radar tube is utilized on which the angular positions of all targets in an explored volume are indicated on the face of the tube. The coordinates of this type of cathode ray tube display surface are commonly known and indicated as "pitch and nod" angles, where the "pitch" is defined as the angle between the horizontal plane and a plane through the target and the transverse axis of the aircraft in which the equipment is located while "nod" is defined as the angle between a line to the target and a vertical longitudinal plane through the aircraft. The angular position of the target image on the tube face in the form of an illuminated spot must be transmitted to a tracking unit which operates in azimuth and elevation. Knowing the pitch and nod angles of a given target imaged on the presentation surface, these angles being directly derived from the position of the target spot indication on the cathode ray tube face, they can be used to determine the corresponding elevation and azimuth angles and transmitted as usable electric signals to operate the tracking unit in elevation and azimuth.

In carrying out the invention, control means in the form of control cards or supports are used, each having electrical conductors or wires under a partially electrically conductive surface or film connected to voltage divider devices or means for supplying predetermined electrical potentials or voltages to each of the wires proportional to the nod or pitch angles or coordinates which they represent. There are two supporting control cards, each identical in size to the size and shape of the maximum target image presentation area on the surface of the cathode ray tube covered by the area of the pitch and nod coordinate indications on the face of the CRT presentation tube, the cards being fixed in position relative to the presentation surface of the tube. An adjustable support is provided which is movable in a predetermined oriented position in the pitch and nod coordinate directions and is provided with a pointer for registration with the pitch and nod coordinate indications on the CRT tube target image presentation surface, this adjustable support having two spaced electrical contacts, one being in electrical contact with each of the partially conductive surfaces of each of the cards, each contact forming with the imbedded wires in the respective cards a means for varying the electrical potential to a servo-amplifier, the voltage divider devices respectively supplying the predetermined energizing potentials to the conductor wires in the "azimuth" and "elevation" control cards. Variations in the electrical potentials in the conductor wires under the partially conductive surface of each card are picked up by the respective adjustable contacts and conveyed through a suitable servo amplifier to adjust a motor connected to a reference potentiometer, employed to provide an electrical feed back control and adjust a selsyn transformer unit which, in turn, controls the position of a tracking unit, the electrical feed back adjusting the electrical potential from the servo-amplifier to the servo motors which move the azimuth and elevation tracking units proportional to the adjustment of the tracking unit.

Other objects and advantages will become apparent from the following description and the accompanying drawings in which like reference characters refer to like parts in the several figures and description.

Fig. 1 is a somewhat diagrammatic plan view of our invention, illustrating the same applied in cooperative relation to the target image presentation surface of a conventional search radar oscilloscope or tube having pitch and nod coordinate indicia on the target image presentation surface as shown.

Fig. 2 is an enlarged plan view of the presentation surface of the radar CRT oscilloscope tube shown in Fig. 1, and two transverse sets of parallel coordinates thereon.

Fig. 3 is an enlarged plan view of the azimuth tracking control card shown in Fig. 1 illustrating some of the imbedded wires and association of a voltage divider for supplying predetermined electrical potentials to the imbedded wires.

Fig. 4 is a similar diagrammatic view of the elevation control tracking card shown in Fig. 1 also showing some of the imbedded electrical conductor wires and some of the electrical connections between the conductor wires and the elevation voltage divider for supplying predetermined electrical potentials to the conductor wires in the card.

Fig. 5 is an enlarged fragmentary plan view of the azimuth tracking control card, the partially electrical conductive surface or film being broken away to show the conductor wires thereunder, and Fig. 6 is a sectional view taken approximately on line 6—6 of Fig. 5 showing a somewhat diagrammatic arrangement of the conductor wires below the partially electrically conductive contact surface of the card.

Referring to Fig. 1 of the drawings, the reference numeral 2 indicates somewhat diagrammatically, the target image presentation surface of a cathode ray oscilloscope tube or scope 1 of a search radar apparatus of the CRT presentation type, the "viewing" end of this tube being also shown in Fig. 2 on a relatively enlarged scale with the pitch and nod angle coordinate indicia thereon.

On the surface 2 is illustrated an illuminated spot 3 representing the position of the target image and denoting the location of the target image with reference to the "pitch" and "nod" angle coordinates, the "pitch" angle coordinates are indicated at 4, 4a and 4b, and comprise a first set of parallel coordinates in which the coordinate 4, passing through the center of the coordinate system, denotes zero pitch angle of the target with reference to a horizontal plane at the location of the apparatus. In an aircraft it would be a horizontal plane passing through the transverse and horizontal flight axes of the aircraft. The coordinates 4a and 4b represent plus and minus pitch angles relative to the zero pitch angle, representing angles between the said horizontal plane and a plane to a selected target above, or below, the "zero" pitch angle or horizontal plane just referred to. This angle is referred to in the specification as the pitch angle. When the illuminated target image spot 3 is in register with the coordinate 4a marked +90°, for instance, the target is located in a plane perpendicular to the aforesaid horizontal plane and the flight axis, above the radar scope, while if the target spot 3 is in register with the coordinate 4b, marked —90°, the target is in the same vertical plane but below the radar apparatus and aircraft.

The second set of parallel coordinates are indicated at 5, 5a and 5b denoting the position of the target in "nod" angle indicating directions, the coordinate 5 denoting zero nod angle direction while the coordinates 5a and 5b indicate the plus and minus nod angles from the vertical plane through the longitudinal axis of the aircraft. The reference numeral 5a denotes plus nod angle, for instance, the location of a target to the right of the flight axis direction of the aircraft, coordinates 5b denoting nod angle directions to the left. In Fig. 2 the nod angle location of the target is approximately —20°, to the left of the aircraft longitudinal axis, as indicated by the registration of the illuminated target image spot 3 with the —20° nod angle coordinate. If the target is to the right of the aircraft the spot 3 would be located in the opposite direction, its nod angle from the coordinate 5 denoting the magnitude of the nod angle. The target image presentation surface 2 is therefore the area of the elongated rectangle covered by the two transverse sets of parallel coordinates 4, 4a and 4b, and 5, 5a and 5b.

An adjustable elongated support 6 is provided, movable in a predetermined oriented position in a plane preferably above and in substantially parallel relation to the plane of the target image presentation surface 2. The adjustable mounting means for the support is a conventional pantograph, comprising a disc or plate 7 to which two pairs of equal length parallel supporting arms or levers 8—8 and 9—9 are pivoted. The two arms 8—8 are pivoted on the plate 7 on one axis extending across the plate 7, at 10—10 parallel to coordinates 4, 4a, and 4b, while the other two parallel arms or levers 9—9 are pivoted at 11—11 to the plate on a relatively perpendicular intersecting axis across the plate, midway between the pivots and parallel to the coordinates 5, 5a, and 5b. The opposite or free ends of the parallel levers 8—8 are pivoted to a fixed support or bracket 12 at 13, 13, on pivots disposed in a plane parallel to the plane containing the pivots 10—10. The free ends of the other set of parallel arms 9, 9 are pivotally connected at 14, 14 to the elongated adjustable support 6 in a plane parallel to the plane including the pivotal axes 11—11. This parallel or pantograph motion provides means for supporting the elongated support or bar 6 for movement in any direction in a predetermined oriented relation to the two sets of perpendicular coordinates 4, 4a, 4b, and 5, 5a, 5b on the target image presentation surface 2.

A pointer member or indicator 24 is fixed to the adjustable support 6 for identical movements therewith, with its extremity in register with the target image spot indication 3, for movement along either set of the transverse coordinates 4, 4a, 4b, or 5, 5a, 5b. One of the adjusted positions of the bar member 6 being disclosed in dotted lines in Fig. 1.

An elevation tracking control unit is diagrammatically indicated at 16, and a separate azimuth tracking control unit at 17. The tracking control units are not illustrated or described in detail but may comprise control means for adjusting some movable control element in plus or minus elevation relative to the target plus or minus pitch angle indicated and adjusting the movable control element, or another movable control element, in plus or minus azimuth direction corresponding to the position of the target in plus or minus nod angle direction. These movable control elements may be the elevation and azimuth direction control elements of an airplane such as the elevators and rudder, or may be elevation and azimuth adjustment control mechanisms of a gun laying device.

The relative adjusted positions of the elevation and azimuth tracking units 16 and 17 are controlled or determined by the adjusted positions of elevation and azimuth control selsyns 16a and 17a, the adjusted positions of the selsyn control units 16a and 17a being in turn determined by adjusting motors 16b and 17b, an elevation voltage control potentiometer 16c being connected to the motor 16b for its controlling adjustment while an azimuth voltage control potentiometer 17c is similarly provided to control the actuating adjustment of the motor 17c. An elevation control servo amplifier 16d is electrically connected by a feed back circuit 30 from the reference potentiometer 16c to control the adjusted positions of the selsyn 16a, the servo amplifier output being controlled by predetermined variations in the voltage potential obtained from the wires in the elevation control card 25, later described as determined by an elevation voltage potential divider device or mechanism 28 connected to the wires in the card, diagrammatically shown in Fig. 4.

The azimuth tracking apparatus also includes a reference potentiometer 17c for controlling its adjustment, and an azimuth servo amplifier 17d having an electrical output which is controlled by predetermined variations in voltage or electrical potential delivered thereto from wires under a partially electrically conductive surface of the azimuth control card 26 later described, connected to an azimuth voltage divider device or mechanism 29, diagrammatically shown in Fig. 3.

Current is supplied to the elevation or azimuth control motors 16b and 17b to rotate the same to adjust the potentiometers 16e and 17e, and adjust the positions of the control selsyns (generators) 16a and 17a. The adjustment of the potentiometers 16c and 17c by the relative adjustments of the motors 16b and 17b produces an electrical feed back signal pickoff or an electrical voltage balance in the respective servo amplifiers 16d and 17d when the potentiometers are adjusted by the control motors proportional to the voltage potential from the contacts 20—21.

The electrical conductors between the drive means for elevation and azimuth direction tracking units 16 and 17 and their control selsyns 16a and 17a are indicated at 16f and 17f, with the electrical energizing conductors 16g and 17g connected between the elevation and azimuth tracking position control motors 16b and 17b and the elevation and azimuth servo amplifiers 16d and 17d. The feed back signal circuits from the potentiometers 16c and 17c to control the servo-amplifier output voltages and potentials to the motors 16b and 17b are indicated at 16h and 17h while the predetermined input voltages to the elevation and azimuth tracking control servo amplifiers 16d and 17d from the wires in the elevation and azimuth cards from the voltage divider means 28 and 29 are supplied by the electrical conductors 18 and 19, these elevation and azimuth circuit conductors 18 and 19 having flexible portions 18a and 19a respectively connected to the electrical contacts or brushes 20 and 21 fixed to the ends of arms 22 and 23 that are rigidly attached to the elongated support or bar member 6. As shown in the drawings the contact arms 22 and 23 with their contacts 20 and 21 are located in spaced relation to each other along the right hand edge of the adjustable supporting bar 6, in spaced relation to a pointer 24 which is adapted for cooperative registration with the target image illuminated spot 3, and with the two sets of transverse nod and pitch coordinates on the target image presentation surface 2.

Slidable contacts 20 and 21, are arranged for identical movements in any direction with the pointer member 24. In Fig. 1 the end of the pointer 24 and the locations of the contacts 20 and 21 are in a plane extending parallel to the bar member 6 and to the coordinates 5, 5a and 5b. Separate elevation and azimuth control cards 25 and 26 are fixedly disposed under each of the contacts 20 and 21 respectively, comprising the elevation and azimuth voltage potential control cards 25 and 26. These cards 25 and 26 each comprise a partially electrically conductive surface or film indicated at 27 in Fig. 6, each of these surfaces on the respective cards 25 and 26 being in electrical contact with one of the movable contact members 20 and 21. The cards are preferably identical in size and shape to the target image presentation surface 2 enclosed by the two transverse sets of parallel coordinates and occupy the same positions and orientations relative to their respective cooperating contact members 20 or 21 that the position and orientation of the target image presentation surface covered by the transverse sets of coordinates occupies to the position of the contact end of the pointer member 24.

The contact card member 25 is the elevation tracking voltage control card while the other card contact member 26 is the azimuth tracking voltage control card.

The elevation and azimuth voltage control cards 25 and 26 each have a large number of spaced small electrically conductive wires mounted therein respectively under their upper partially electrically conductive surfaces or films in predetermined relations to the directions of the relative positions of the predetermined transverse coordinates on the target image presentation surface 2.

The elevation voltage control card 25, as shown in Fig. 4, is provided with two sets of circular concentric electrical conductor wires 25a and 25b imbedded under its partially electrically conductive surface having their centers located respectively at 25c and 25d, which supply the plus and minus 90° elevation tracking control voltages respectively when the movable elevation contact 20 is in the similar positions on the card to that occupied by the plus and minus 90° pitch coordinate positions on the zero nod coordinate 5 on the image presentation surface 2. The other curved or circular electrical conductor wires 25a and 25b are located in relative positions on the card 25 which are identical to the locations of the intersections of the other pitch coordinates 4, 4a, 4b, with the nod coordinates 5, 5a, 5b on the surface 2. Thus, when the adjustable elevation contact 20 is moved over the partially conductive surface 27 of the elevation card 25 to a point intermediate any two adjacent conductor wires 25, 25a or 25b the voltage potential delivered in the control circuit through the conductor 18 is proportional to the position of the movable contact 20 to the nearest wires and the current voltage is, of course, proportional to the position of the pointer 24 on the pitch and nod coordinates of the coordinate system on the tube surface 2.

The other, or azimuth voltage tracking control card 26 also has electrical conductor wires 26a located below the partially conductive surface or film 27 thereof in different predetermined positions and locations, each wire having a predetermined azimuth coordinate voltage representing a definite azimuth tracking direction value, with respect to the position of the contact member 21 to the wires 26a, proportional to the position that the outer end of the pointer 24 bears to the pitch and nod coordinates 4, 4a or 4b and 5, 5a or 5b on the tube surface 2. A considerable number of the small electrical conductor wires are preferably employed on each of the elevation and azimuth cards 25 and 26, located below the plane of movement of the adjustable elevation and azimuth contacts 20 and 21, the partially conductive films 27 on the two cards 25 and 26 being in contact with these wires in the respective cards and with the adjustable contacts 20 and 21 respectively. The cards 25 and 26 plus their respective movable contacts 20 and 21 each controlling the voltages to the tracking units 16 and 17 respectively.

Any suitable well known voltage divider means may be provided for supplying the predetermined voltages and potentials to the individual conductor wires in the respective cards 25 and 26, for adjusting the tracking units 16 and 17 to predetermine different elevation and azimuth control positions, according to the adjusted positions of the contact 20 with respect to the wires 25b and 25a and as a result of the adjusted positions of the pointer member 24 to the nod coordinates 5, 5a, and 5b on the target image presentation surface 2. For instance, separate voltage divider devices of conventional construction as diagrammatically illustrated in Figs. 3 and 4 may be employed in each of the elevation and azimuth electrical control circuits for supplying fixed predetermined electrical potential values, preferably A. C. voltages to each of the respective small conductor wires on each of the cards. These voltage dividers are schematically illustrated at 28 and 29 in Fig. 1 to complete the respective elevation and azimuth control circuits through the conductors 30 and 31 to the elevation and azimuth servo amplifiers 16d and 17d.

Assuming that a target image is indicated on the surface 2 by the illuminated spot 3, the location of this target image on the surface 2 is determined by the point of intersection of the transverse pitch and nod coordinates at the point of registration with the target image spot 3. In order to correspondingly adjust the elevation and azimuth tracking units 16 and 17 to control tracking apparatus for tracking the target, for instance adjusting the elevation and azimuth adjusting mechanism of a gun laying means to point a gun at the target, or adjusting the elevators and rudder of an aircraft carrying the search radar scope surface 2 to follow the selected target, the operator moves the extremity of the adjustable pointer 24 in registration with the target image indicating spot 3 on the surface 2, and, of course, at the point of intersection of the transverse coordinates in register with the target image spot. The adjustment of the pointer 24 causes simultaneous identical adjustments of the elevation and azimuth contacts 20 and 21 on the partially conductive contact surfaces 27 of the fixedly oriented elevation and azimuth tracking direction control cards 25 and 26. Since the two cards 25 and 26 are identical in shape and size to the transverse coordinate target spot image presentation surface 2, the relative positions of the adjustable contacts 20 and 21 on the cards 25 and 26 will always be identical to the relation of the pointer 24 to the transverse pitch and nod coordinates 4, 4a, 4b and 5, 5a, 5b on the presentation surface 2. The adjusted positions of the contact 20 over the conductor wires located under the partially conductive surface or film 27 of the elevation control card 25 adjusts the elevation tracking control circuit potential to the servo amplifier 16d to a predetermined electrical value, operating the motor 16b, in one direction or the other to adjust the position of the selsyn 16a, the selsyn 16a in turn adjusting the tracking unit 16 to a predetermined position. Adjustment of the motor 16b adjusts the potentiometer 16c to provide a feed back control to the servo amplifier 16d to produce a zero voltage to the motor 16b when the tracking unit has been adjusted to its corresponding adjusted elevation control position. The adjustment of the other or azimuth control operates in the same manner. The voltage potential delivered to the servo amplifier 17d will be proportional to the adjusted position of the contact 21 relative to the conductor wires 26a and 26b under the partially conductive surface 27 of the azimuth control card 26, and the servo amplifier delivers electrical potential to the motor 17g, the motor adjusting selsyn 17a and potentiometer 17c. When the selsyn is correspondingly adjusted to correspond to the newly adjusted position of the contact 21 the azimuth tracking unit will be adjusted to its predetermined azimuth control position, the adjustment of the potentiometer 17c controls the electrical potential in the feed back conductor 17h to the servo amplifier 17d to reduce the current to the motor 17b to zero, thus maintaining the azimuth tracking unit 17 in any definite predetermiend adjusted position relative to a definite adjusted position of the contact 21 and a corresponding definite adjusted position of the pointer 24 relative to the nod coordinate system on the surface 2. Movement of the pointer 24 along one set of coordinates, for instance along one of the pitch coordinates, unbalances the elevation tracking unit control circuit, to correspondingly adjust the elevation tracking unit until the elevation control circuit is balanced with the elevation tracking unit 16 correspondingly adjusted. The azimuth tracking unit 17 is likewise adjusted by movement of the pointer 21 along the other set of the pitch coordinates. While it has been mentioned that the target image presentation surface has transverse coordinate indicia thereon, it should be understood that in actual practice these coordinates could be omitted. The location of the target would still be determined, by the position of the illuminated target spot 3 on the target image presentation surface 2. When the pointer is moved into register with the target image spot 3, the elevation and azimuth tracking units would correspondingly be adjusted as before set forth.

Having thus described our invention in connection with a somewhat simple structural illustration for exemplary purposes, it will be understood that the invention is not limited to the specific embodiment but is capable of rearrangement and modification without departing from the spirit of the invention and within the scope of the appended claims.

We claim:

1. In a coordinate translator apparatus for converting information relative to the positions of transverse coordinates of a first coordinate system to equivalent electrical values relative to a second coordinate system, a first support having a first coordinate system thereon, a second support having an electrical contact surface identical in size and shape to said first coordinate system including a multitude of spaced small electro-conductive wires carried by said second support and positioned in predetermined spaced oriented relation to the locations and directions of said coordinates in said first coordinate system, means for supplying predetermined different fixed electrical potentials to said wires proportional to the relative locations of said wires on said second support and the relative locations of said coordinates in said first coordinate system, a movable pointer adjustable to register with said coordinates of said first coordinate system, an electrical contact member fixed to said pointer for identical movements therewith in selective electrical energizing relation with said wires, an electrical control circuit including said electrical contact member and said wires having an electrical output, whereby said output is proportional to the selective adjusted registration of said pointer member with said coordinates of said first coordinate system.

2. Apparatus as claimed in claim 1 in which the second support for the electrical conductor wires comprises a contact surface of partially electro-conductive material having said wires disposed thereunder in electrical energizing relation therewith and said electrical contact member is movable on said contact surface in electrical contact therewith, by movement of said pointer in registration with said coordinates of said first coordinate system.

3. An aircraft elevation and azimuth tracking attachment for search radar apparatus having a target spot image presentation surface with transverse pitch and nod angle target position indicating coordinates thereon for registration with said target spot image, an elevation tracking device including an elevation control circuit and power means for actuating said elevation tracking device, an azimuth tracking device including an azimuth control circuit and power means for actuating said azimuth tracking device, elevation voltage divider means connected between said elevation control circuit and said power means for selectively controlling the power means for actuating the elevation tracking device, azimuth voltage divider means connected between said azimuth control circuit and said power means for said azimuth tracking device for selectively actuating the azimuth tracking device, an adjustable support movable in a predetermined oriented relation in transverse intersecting directions parallel to said presentation surface, a pointer fixed on said adjustable support for registration with the target spot image on said presentation surface and said pitch and nod coordinates, said elevation control circuit including an electrical elevation control contact member fixed to the adjustable support for identical movements with the pointer in contact with said elevation voltage divider means for selectively varying the electric potential in the elevation control circuit proportional to the point of registration of the pointer member with said pitch angle indicating coordinates, said azimuth control circuit including an electrical azimuth contact member fixed on the adjustable support for identical movements with the pointer in contact with said azimuth voltage divider means and connected in the azimuth control circuit for selectively varying the electrical potential in the azimuth control circuit proportional to the point of registration of the pointer member with said nod coordinates on said presentation surface.

4. An elevation and azimuth direction tracking attachment for search radar tube having a target spot image presentation surface with transverse sets of pitch and nod angle indicating coordinates thereon for registration with the target spot image presentation; an elevation tracking device, an elevation control circuit therefor connected to the elevation tracking device for adjusting the position thereof in elevation; an azimuth tracking device, an azimuth control circuit therefor connected to the azimuth tracking device for adjusting the position thereof in azimuth, a shiftable elongated support having a predetermined oriented position, a pointer fixed to the shiftable support for registration with the target spot image on said surface in registration with said pitch and nod angle coordinates, an elevation control means comprising a member having a partially electrically conductive surface substantially equal in shape and size to the target spot image presentation surface disposed in fixed spaced relation to the target spot image presentation surface, including a plurality of relatively spaced electrical conductor wires under said partially conductive surface positioned in a predetermined oriented relation to the pitch angle coordinates on said presentation surface and a contact member fixed to the shiftable support and connected in said elevation control circuit for identical movements with said pointer in contact with said partially conductive surface above said conductor wires, means for applying predetermined different electric potentials to the said conductor wires representative of the positions of the target image spot, relative to said pitch angle coordinates for applying predetermined voltage potentials to the elevation tracking device proportional to the point of registration of the pointer on said pitch coordinates, an azimuth position control means comprising a member having a partially electrically conductive surface having an electrical contact area substantially equal in size and shape to the target spot image presentation surface fixed in spaced relation to the target spot image presentation surface, a plurality of small electrical conductor wires disposed under said last mentioned conductive surface in predetermined oriented positions to the locations of the nod angle coordinates on said presentation surface, means for supplying predetermined electrical potentials to the last mentioned wires and a contact member fixed to the shiftable support connected in said azimuth control circuit for identical movements with the pointer in contact with the last mentioned partially conductive surface, said azimuth control circuit being connected between the azimuth tracking device contact member and said means for supplying predetermined electrical voltage potentials to said wires in the azimuth tracking device proportional to the point of registration of the pointer on said nod angle coordinates on the target spot image presentation surface.

5. In a power operated tracking attachment for a target spot image presentation surface of a search radar scope, having two perpendicular sets of parallel coordinates thereon denoting the position of a target spot image thereon in pitch and nod angles, a support fixed relative to said surface, an elevation control energizing card, and an azimuth control energizing card, both fixed in similarly oriented spaced relation to the said surface and said pitch and nod coordinates, pantograph means fixed to said support having a pointer movable to register with the target spot and said pitch and nod coordinates, an elevation contact member connected for identical movement with said pointer in contact with said elevation control energizing card, an azimuth control contact member connected for identical movements with said pointer in contact with said azimuth control card, said cards each having an upper partially electro-conductive surface in contact with the respective elevation and azimuth contact members, and a plurality of spaced small conductor wires disposed under said partially electro-conductive surface in contact therewith, voltage divider means for supplying predetermined electrical potentials to said wires, an elevation energizing circuit connected between said voltage divider means for said elevation control energizing card and said elevation contact member, elevation tracking means connected in said elevation energizing circuit to be adjusted thereby, an azimuth energizing circuit connected between said voltage divider means for said azimuth control energizing card and said azimuth contact member, azimuth tracking means connected in said azimuth tracking circuit to be actuated thereby, whereby adjustment of the pointer relative to said pitch and nod coordinates adjust said elevation and azimuth tracking means in predetermined relation to the positions of the elevation and azimuth contacts, with relation to said electro-conductor wires on said cards.

6. Apparatus as claimed in claim 5 in which each card has a plurality of conductor wires thereon, under the partially conductive surface, and includes a servo-amplifier having an energizing circuit connected between the voltage divided means and movable contact member for that card, whereby movement of the said movable contact member varies the electrical potential to the servo-amplifier proportional to the current potential impressed on the wires below that contact member, a tracking unit for each card, a selsyn controlling the position of the tracking unit, motor means connected to the servo-amplifier to be adjusted thereby proportional to the output of the servo-amplifier, an operating connection between said motor and said selsyn for adjusting said selsyn, a potentiometer connected to said motor for predetermined adjustment thereof by said motor and an electrical feed back circuit from said potentiometer to the servo-amplifier for varying the servo-amplifier output potential to said motor proportional to the adjustment of said motor.

7. In a pitch and nod coordinate converter device for a search radar scope having a target spot image presentation surface with transverse sets of parallel pitch and nod angle indicating coordinates thereon for registration with the target spot image to indicate the pitch and nod angles of a selected target with reference to the location of the target spot image on said presentation surface, a pointer movable over the presentation surface in predetermined oriented relation for registration with the target spot and said pitch and nod angle indicating coordinates, spaced electrical elevation and azimuth contacts connected to said pointer for identical movements therewith, an elevation control card disposed in fixed spaced oriented relation to the presentation surface having a contact surface area similar to the area within the pitch and nod coordinate system on the presentation surface, disposed for contacting engagement by said elevation contact, an azimuth control card disposed in fixed spaced oriented relation to the said presentation surface, having a contact surface area similar to said area within said pitch and nod coordinate system on the presentation surface, disposed for contacting engagement with said azimuth contact, said elevation control card having a partially conductive surface and a plurality of spaced electrical conductors below said last surface in contact therewith and arranged in predetermined relation on the card to said pitch coordinates, voltage divider means connected to said conductor wires in that card including an elevation control energizing circuit for imposing predetermined electrical potentials on said wires in that card proportional to their locations in that card and including said elevation contact in said elevation control circuit, said azimuth control card having a partially conductive surface and a plurality of spaced electrical conductors below the last surface in contact therewith and arranged in predetermined relation in the card to the nod coordinates, voltage divider means connected to the conductor wires in that card, including an azimuth control energizing circuit for imposing predetermined electrical potentials on the wires in that card proportional to their locations on that card and including said azimuth contact in said azimuth control energizing circuit, an elevation tracking means and connected means for adjusting said elevation tracking means proportional to the electrical output from said elevation control energizing circuit, azimuth tracking means and connected means for adjusting said azimuth tracking means proportional to the electrical output from said azimuth control energizing circuit.

8. A power actuated tracking attachment for use with a search radar scope having a target spot image presentation surface on which the position of an illuminated spot image of the selected target is indicated with reference to transverse pitch and nod angle indicating coordinates on said presentation surface, elevation tracking power means, azimuth tracking power means, an elevation tracking control circuit connected to the elevation tracking power means for the actuation thereof, relatively shiftable elevation contact means in the elevation tracking control circuit to selectively vary the energizing potential in the elevation tracking control circuit, relatively shiftable azimuth contact means in said azimuth tracking control circuit to selectively vary the energizing potential in the azimuth tracking control circuit, an adjustable support movable in transverse intersecting directions parallel to said pitch and nod coordinates in a fixed predetermined oriented relation thereto, a pointer fixed to said adjustable support for identical movements therewith over said presentation surface for registration with the target spot image on said presentation surface, with reference to said pitch and nod coordinates, a rigid actuating connection between said adjustable support and the movable contact of said relatively shiftable elevation contact means for identical adjustments thereof by said pointer, a second rigid connection between said adjustable support and the movable contact of said relatively shiftable azimuth contact means for identical adjustments thereof by said pointer, whereby predetermined movement of the pointer over said presentation surface into selective registration with said pitch coordinates in one direction correspondingly adjusts the elevation tracking device circuit control contacts and movement of the pointer over said presentation surface into selective registration with said nod coordinates correspondingly adjusts the azimuth tracking device circuit control contacts, and means in said elevation and azimuth tracking control circuits for varying the electrical potential in said last mentioned control circuits proportional to the relative adjusted positions of said shiftable contacts.

9. A power actuated target tracking attachment for a search radar scope having a target spot image presentation surface for indicating the pitch and nod angle position of a target, indicated by a target spot image on said presentation surface, comprising a pair of oriented electrical contact members fixed relative to the presentation surface, each contact member having a partially electro-conductive contact surface similar in size and shape to the area on said presentation surface traversed by the target spot image and similarly oriented, a plurality of electrically conductive wires in said contact member below said partially electro-conductive surface in contact therewith, located in predetermined oriented relations to predetermined pitch and nod angle determining positions on the presentation surface relative to target spot image registration therewith with respect to corresponding zero pitch and zero nod angle position on the presentation surface, a movable pointer member disposed for registration with the target spot image on the presentation surface, a pair of electrical contacts connected to the pointer for identical movements therewith each in contact with one of said partially electro-conductive surfaces in identical contact position on said last mentioned surfaces to the positions of the pointer on said presentation surface, a pair of voltage divider means each including a tracking output circuit and an energizing circuit connected between the wires under each of the partially conductive surfaces and the movable contact for the last mentioned surface, for supplying predetermined electrical potentials to predetermined wires relative to their positions under said surfaces whereby the tracking output circuit potentials are proportional to the positions of the movable contacts on the partially conductive surfaces above said wires, an elevation tracking control circuit connected to one of said tracking output circuits and an azimuth tracking control circuit connected to the other tracking output circuit, and elevation and azimuth tracking means connected respectively to said elevation and azimuth tracking control circuits for selective elevation and azimuth adjustments thereby

References Cited in the file of this patent
UNITED STATES PATENTS

| | | |
|---|---|---|
| 2,080,186 | Reymond | May 11, 1937 |
| 2,455,963 | Wheeler | Dec. 14, 1948 |